Dec. 3, 1940.  H. E. JOHNSON  2,223,616
SAFETY LIGHTING SYSTEM FOR AUTOMOTIVE VEHICLES
Filed June 29, 1938
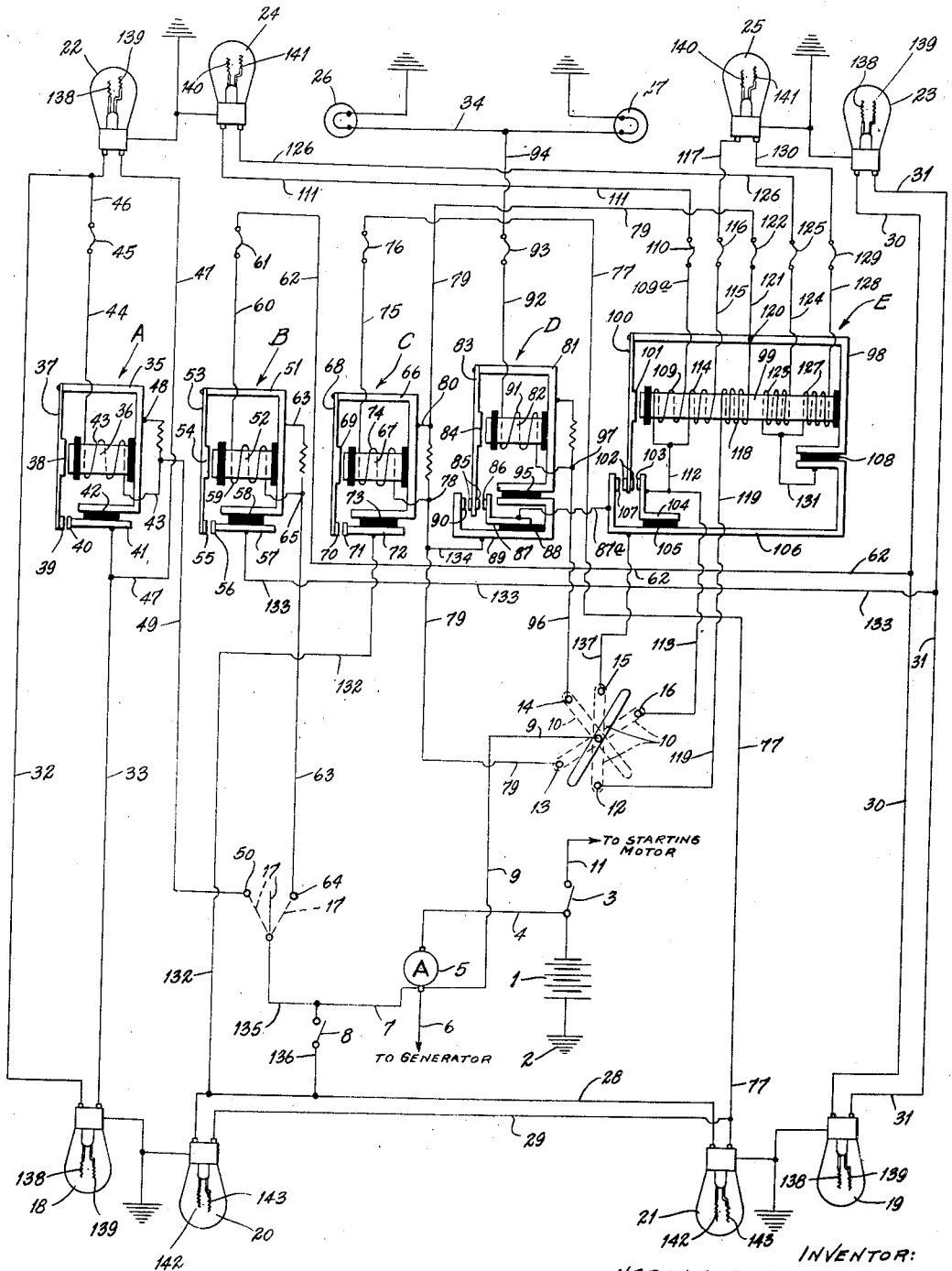
INVENTOR:
HARRY E. JOHNSON, incompetent,
BY Lula B. Johnson
HIS CONSERVATRIX.

Patented Dec. 3, 1940

2,223,616

UNITED STATES PATENT OFFICE 2,223,616

SAFETY LIGHTING SYSTEM FOR AUTOMOTIVE VEHICLES

Harry E. Johnson, incompetent, Madison, Ill., by Lula B. Johnson, conservatrix, Madison, Ill.

Application June 29, 1938, Serial No. 216,510

2 Claims. (Cl. 171—97)

This invention relates to improvements in electrical lighting systems for automotive vehicles such as trucks, busses, automobiles, and the like. As is well known, such vehicles are equipped with headlights, one or more tail lights, parking lights, turn signal lights and stop lights, for the protection of the driver, as well as other drivers using the same thoroughfare.

Because of the numerous lights required, failure of any one of them frequently leads to disaster. This is particularly true when the failing light is located at the rear of the vehicle, in which event the driver is unaware of the defect.

The principal object of this invention is the provision of means whereby the failure of any light or lights to properly function, will automatically and instantaneously cause the illumination of a substitute light or lights. To this end, a system is provided of circuits which automatically switch the light-giving energy from main to auxiliary circuits, or vice versa.

In carrying out the invention, each of the various lamps, except the parking lamps, is provided with a multi-filament bulb, and it is a feature of the invention that each of said filaments has its own individual circuit.

More particularly, the invention includes a plurality of relays, which automatically switch the energy from a selected circuit to an auxiliary circuit whenever the former becomes defective, thereby minimizing the dangers of night driving.

With specific reference to the headlights, the present system provides for the illumination of the secondary filament upon failure of the main filament in either of them to glow, or vice versa.

Further, as to the tail light, the invention provides for the illumination of the stop light filament upon failure of the tail light filament, thereby insuring that at all times, the vehicle will be marked with a "red" light at the rear.

Failure of a main filament in the turn signal lights, likewise automatically causes the secondary filament to glow.

A particularly important feature of the system is the provision for the energization of the dim or low ray filaments of the headlights, should one or both of the parking lights fail.

Another important feature of the invention resides in the arrangement whereby all of these circuits are incorporated in a single system, adapted to be installed on any present-day vehicle, with but a few alterations in the conventional wiring installations.

It is to be understood of course, that the protection afforded is not permanent, but provides the illumination required by law until defects can be remedied.

Other objects and advantages of the invention will be apparent or pointed out in the following description in conjunction with the drawing, which forms a part of this specification.

Said drawing illustrated in diagrammatic form the preferred system of the present invention. For the present, it is deemed advisable to enumerate the various components of the system, the various circuits included to be described in detail subsequently.

Numeral 1 indicates the usual storage battery, grounded to the frame of the vehicle as at 2. The customary starter switch 3 is connected by a lead 4 to the ammeter 5, whence a line 6 leads to the generator, (not shown). A lead 7 connects the ammeter and the stoplight switch 8, which is actuated by a brake pedal, (not shown). The switch 8 is shown in the "off" position.

Numeral 9 indicates a lead between the ammeter and a manually operated combination head, tail, and parking light switch 10. Numeral 11 designates a lead to the starting motor, (not shown). Stationary contacts 12, 13, 14, 15, 16, co-operate with switch blade 10.

A manually or automatically controlled right or left turn signal switch is indicated at 17, and is at all times in communication with the battery, either through the ammeter as illustrated, or directly. Located at the rear of the vehicle are turn signal lights 18 and 19, and combined tail and stop lights 20 and 21. Located at the front of the vehicle are turn signal lights 22 and 23, headlights 24 and 25, and parking lights 26 and 27. All lights are grounded as shown.

The tail lights are connected by leads 28 and 29. Leads 30 and 31 connect lights 19 and 23, and lead 32 lights 18 and 22. Lead 33 connects light 18 to a contact supporting member to be described later. Parking lamps 26 and 27 are connected by a lead 34.

The relays employed include a left turn signal relay A, right turn signal relay B, tail light relay C, parking light relay D, and headlight relay E.

Relay A includes a frame member 35, core 36, armature blade 37, a boss thereon 38, and a contact thereon 39. A contact 40 is mounted on a support 41, between which and the frame 35 a block of insulation 42 is interposed. A repulsion winding 43 on core 36 is connected by a wire 44 to fuse 45, in turn connected to lead 32 by wire 46. A connection between lamp 22 and lead 33 is designated 47. Winding 43 connects to frame 35 as at 48. A lead 49 connects said winding to switch point 50 of turn signal switch 17.

Relay B includes frame 51, core 52, armature blade 53, its boss 54 and contact 55. A contact 56 is mounted on a support 57, an insulating block 58 being positioned between the latter and frame 51. Repulsion winding 59 on core 52 is connected by wire 60 to fuse 61, and a lead 62 connects the fuse with the lead 30 of the right turn signal light circuit. A lead 63 connects frame 51 with switch point 64 of turn signal switch 17. Winding 59 is connected to line 63 at 65.

Tail light relay C is of similar construction. Mounted on frame 66 is a core 67, armature 68 with an integral boss 69 and a contact 70. A contact 71 is mounted on support 72, with an insulating block 73 between the latter and frame 66. Repulsion coil 74 by means of wire 75 is connected to fuse 76, in turn connected by lead 77 to light 21. Winding 74 is connected at 78 to conductor 79, in turn connected by wire 80 to frame 66.

Relay D includes a frame 81, core 82, armature 83, boss 84 and dual contact 85. Also a contact 86 on support 87, the latter insulated from member 89 as at 88. A contact 90 is fixed on member 89. Repulsion coil 91 is connected by wire 92 to fuse 93, lead 94 connecting the latter with line 34. Insulation 95 is interposed between member 89 and frame 81, connected by line 96 with switch point 14. Winding 91 joins line 96 at 97. A wire 87a connects contact supports 97 and 106.

Referring now to relay E, 98 indicates the frame, 99 the core, 100 the armature, 101 the boss thereon, 102 a dual contact, 103 a contact on member 104, insulated by block 105 from support 106 carrying contact 107 as illustrated. Insulation 108 is interposed between contact support 106 and frame 98.

Numeral 109 indicates an attraction winding connected by wire 109a to fuse 110, in turn connected to light 24 by line 111. A lead 112 connects coil 109 and a wire 113 leading to switch point 15. It likewise connects an attraction coil 114 on core 99 with components 109, 104 and 113 as shown. Coil 114, by means of wire 115 is connected to fuse 116, in turn connected to light 25 by wire 117.

Attraction coil 118, connected to switch point 12 by lead 119, connects to frame 98 as at 120, and from that point a lead 121 connects to fuse 122, the latter connected to switch point 13 through lead 79. Numeral 123 designates a repulsion coil on core 99, connected by wire 124 to fuse 125, in turn connected to light 24 by wire 126. A second repulsion coil 127 is connected by wire 128 to fuse 129, in turn connected by lead 130 with light 25. Wire 131 connects coils 123 and 127 to member 106 as shown.

From contact support 72, a wire 132 joins lead 28 of the tail light circuit. Wire 133 connects support 57 and lead 31. Wire 134 connects support 89 and lead 79. Lead 135 connects switch 17 with the ammeter through 7, and lead 136 connects switch 8 and line 28. Switch point 15 is connected to 106 by lead 137.

As previously stated, all of the lights except the parking lamps, are provided with two filaments, in the embodiment shown. The main or normal filaments of the turn signals are indicated at 138, the auxiliary filaments at 139. The main or bright filaments of the head lights are numbered 140, the auxiliary or dim filaments being numbered 141. Stop light filaments are indicated at 142, tail light filaments at 143.

Obviously, the invention also contemplates the use of a pair of single filaments associated with the various lamps, instead of the dual filament arrangement illustrated. The operation of the system would be the same in either arrangement, and it is not considered necessary to illustrate both.

Also, it is obvious that the conventional head light dimming switch may be added if desired, without disrupting the operation of the system. The system operates as follows:

Manually operated switch blade 10, is at all times connected to battery 1. It is important that this be kept in mind, since it will obviate the necessity of tracing various circuits beyond switch 10 to the battery time and again. Also, for the sake of brevity, the various components will frequently be referred to by their respective indicating numerals only.

Assuming that switch blade 10, shown in the "off" position, (full lines), is set on stationary contact 14, a circuit is completed through 14, 96, 97, 91, 92, 93, 94 and 34 to the parking lights, and through 96, 81, 83, 85, 90, 134, 78, 74, 75, 76, 77 and 29 to tail light filaments 143. The magnetic flux set up in core 82 actuates armature 83 away from it closing contacts 85 and 90, to complete the latter circuit.

Upon failure of either or both parking lights 26 and 27, energization of coil 91 will cease, thereby completing an auxiliary circuit through 14, 96, 81, 83, 85, 86, 87, 87a, 106, 131, 123 and 127, 124 and 128, 125 and 129, 126 and 130 to the dim or low ray filaments 141 of the headlights 24.

Thus, failure of the parking lamps is taken care of in a novel and efficient manner until the defective circuit can be repaired. It should be mentioned here that armature 83 is normally biased to the right, as viewed in the drawing.

A feature of the invention resides in the fact that energization of the tail light filaments 143 is continued at the same time, through 10, 14, 96, 81, 83, 85, 86, 87, 87a, 106, 107, 102, 100, 98, 120, 121, 122, 79, 78, 74, 75, 76 and 77. In order to clarify the operation of the circuit just described, it is pointed out that the flow of current through repulsion coils 123 and 127 sets up a flux in core 99 actuating armature 100 to the left, closing contacts 102 and 107.

Should either or both tail light filaments 143 fail, a circuit would automatically be completed through 10, 14, 96, 81, 83, 85, 90, 134, 79, 80, 66, 68, 70, 71, 72, 132 and 28 to stop light filaments 142. This circuit will be clearly understood when it is borne in mind that armature 68 is normally biased to the right, closing contacts 70 and 71, when coil 74 is inactive.

It is apparent therefore, that failure of tail light filaments is automatically rectified by the illumination of the stop light filaments.

Assuming switch 10 is on stationary contacts 12 and 15, two circuits are completed. The first of these, which energizes the dim or low ray filaments 141 of the headlights 24, may be traced from 15 through 137, 106, 131, 123 and 127, 124 and 128, 125 and 129, 126 and 130.

The second circuit, which energizes the tail light filaments 143, may be traced from 12 through 119, 118 and 121, thence as previously described.

It is noted here, that attraction coil 118 is energized simultaneously with repulsion coils 123 and 127, and that coil 118 has a greater number of turns than either coil 123 or coil 127. However, the total number of turns on 123 and 127 exceeds the number on 118.

This arrangement effects the completion of a circuit energizing the main or bright filaments 140, upon failure of the dim or low ray filaments, in either or both headlights. When such failure occurs, the attraction coil 118 causes contacts 102 and 103 to close, coils 123 and 127, (or either of them), having become inactive.

The auxiliary circuit thus set up may be traced from 12 through 119, 118, 120, 93, 100, 102, 103, 104, 112, 109 and 114, 109a and 115, 110 and 116, 111 and 117, to the bright headlight filaments 140.

The bright light circuit, with switch 10 on stationary contacts 16 and 13 will now be explained. Said circuit may be traced from 16 through 113, 112, 109 and 114, 109a and 115, 110 and 116, 111 and 117 to filaments 140.

Should either or both filaments 140 fail, the attraction action of coils 109 and 114 will cease, permitting contacts 102 and 107 to close, (armature 100 being biased to the left), automatically completing a circuit to the low ray filaments 141 of said headlights, from contact 13, through 79, 122, 121, 120, 98, 100, 102, 107, 106, 131, 123 and 127, 124 and 128, 125 and 129, 126 and 130.

The associated tail light circuit may be traced from 13 through 79, 78, 74, 75, 76, 77 and 29 to filaments 143.

The stop light circuit is conventional, and needs no detailed description.

The turn signal switch 17 is connected at all times with the battery, either through the ammeter or directly. It is shown in the "off" position.

Assuming a left turn is to be made, switch blade 17 is brought into engagement with stationary contact 50. This closes a circuit from the latter through 49, 43, 44, 45, 46 and 32 to the main left turn signal filaments 138.

Upon failure of the main filaments 138, repulsion winding 43 becomes inactive, allowing armature 37, (normally biased to the right), to close contacts 39 and 40, thereby establishing a circuit which will energize the auxiliary filaments 139 of said left turn signals 18 and 22. This circuit may be traced from 50 through 49, 48, 35, 37, 39, 40, 41, 33 and 47.

In like manner, when a right turn is to be made, switch 17 is brought into engagement with stationary contact 64. The circuit thus completed is from 64 through 63, 65, 59, 60, 61, 62 and 30 to the main filaments 138 of the right turn signals 19 and 23.

Upon failure of said main filaments, repulsion coil 59 becomes inactive, permitting armature 53, (normally biased to the right), to close contacts 55 and 56. This establishes the auxiliary circuit for the secondary filaments 139 of said right turn signals 19 and 23. It may be traced from 64 through 63, 51, 53, 55, 56, 57, 133 and 31.

In this manner, defects in the main filament circuits of the left and right turn signals are rectified, until they can be repaired.

Obviously, the embodied illustrated and described may be modified in various ways without departing from the scope of the invention. For example, a plurality of single filament bulbs may be incorporated in each light, instead of a multi-filament bulb, as previously mentioned.

The addition of a headlight dimming switch, if desired, is likewise comprehended as hereinbefore stated.

A modified form of the system, requiring fewer circuits, is applicable to boats, airplanes, motorcycles, etc.

The ground arrangement of the various lights is conventionally illustrated, but positive spring-pressed, non-corrosive ground connections are preferred. This is particularly true when lights are mounted on fenders, where vibrations are greatest, and more apt to cause defective ground connections.

The various relays have been described as operating in conjunction with direct current, but the invention also contemplates their use with alternating current, through the medium of shading coils.

Additional circuits and lights, (such as clearance lights), may be incorporated, and other variations made, without departing from the spirit of the invention. Obviously, also, the relays may be used in combination or separately.

Therefore, it is not desired to be limited to the precise arrangement and details illustrated and described.

What is claimed is:

1. In a lighting system for automotive vehicles including a tail light circuit, a stop light circuit and a source of current, means for automatically switching the current from said tail light to said stop light circuit, the instant failure occurs in the first-named circuit, said means comprising a relay including a core, a frame, a pair of spaced stationary contacts and a movable armature mounted on the frame, said armature carrying a contact adapted to cooperate with one of said stationary contacts in the normal operation of the tail light circuit, and adapted to cooperate with the other stationary contact upon failure of said tail light circuit, thereby transferring the current to a second relay having a core, a frame, a stationary contact and a movable armature mounted on the frame, said armature being normally biased away from the stationary contact, and itself carrying a contact adapted when such current transfer occurs to cooperate with the stationary contact to close the stop light circuit.

2. In a lighting system for automotive vehicles including a parking light circuit, a headlight circuit provided with a pair of lamps having main and auxiliary filaments, and a source of current, means for automatically switching the current from the parking light circuit to the headlight circuit in response to failure in the first-named circuit, said means comprising a relay including a core, a frame, a stationary contact and a movable armature mounted on the frame, said armature carrying a contact adapted in the normal operation of the parking light circuit to be spaced away from the stationary contact, but adapted upon failure of said circuit to cooperate with said stationary contact, thereby transferring the current to the frame of a second relay, thence through a pair of leads connected to said relay frame to the auxiliary filaments of the lamps of said headlight circuit.

LULA B. JOHNSON,
*Conservatrix for Harry E. Johnson, Incompetent.*